United States Patent [19]

Boothe

[11] 4,394,702
[45] Jul. 19, 1983

[54] POWER FAILURE DETECTION AND CONTROL CIRCUIT

[75] Inventor: Guy Boothe, Laguna Beach, Calif.

[73] Assignee: Sperry Corporation, New York, N.Y.

[21] Appl. No.: 205,887

[22] Filed: Nov. 10, 1980

[51] Int. Cl.³ .............................................. H02H 3/24
[52] U.S. Cl. ..................................... 361/92; 361/71;
340/663; 307/200 A; 328/150
[58] Field of Search ........................ 361/92, 86, 78, 71;
328/138, 146, 150, 151, 140; 307/200 A, 273,
350; 340/660, 663

[56] References Cited

U.S. PATENT DOCUMENTS

| 3,969,635 | 7/1976 | Wilke | 361/92 X |
| 4,031,463 | 6/1977 | Norberg | 361/92 X |
| 4,031,464 | 6/1977 | Norberg | 361/92 X |
| 4,245,150 | 1/1981 | Driscoll et al. | 361/92 X |
| 4,288,831 | 9/1981 | Dolikan | 361/92 |

OTHER PUBLICATIONS

"One-Shot Serving as Missing Pulse Detector Spots Loss of ac Line Voltage Quickly", Ideas for Design-Electronic Design 11, May 24, 1979, by Kraengel Jr. et al.
"Power Line Voltage Dip Detection", by Bellamy, IBM-Tech. Discl. Bull., vol. 17, No. 12, May 1975.

*Primary Examiner*—Patrick R. Salce
*Attorney, Agent, or Firm*—G. Donald Weber, Jr.; Eugene T. Battjer

[57] ABSTRACT

A circuit is provided for detecting a low power condition which is undesirable and effectively turns off a computer system to prevent incorrect operation thereof. The circuit does not turn on the computer system until the correct power condition is achieved. The circuit is also sensitive to the power condition to establish the time duration permissible for causing the computer system to be turned off.

10 Claims, 2 Drawing Figures

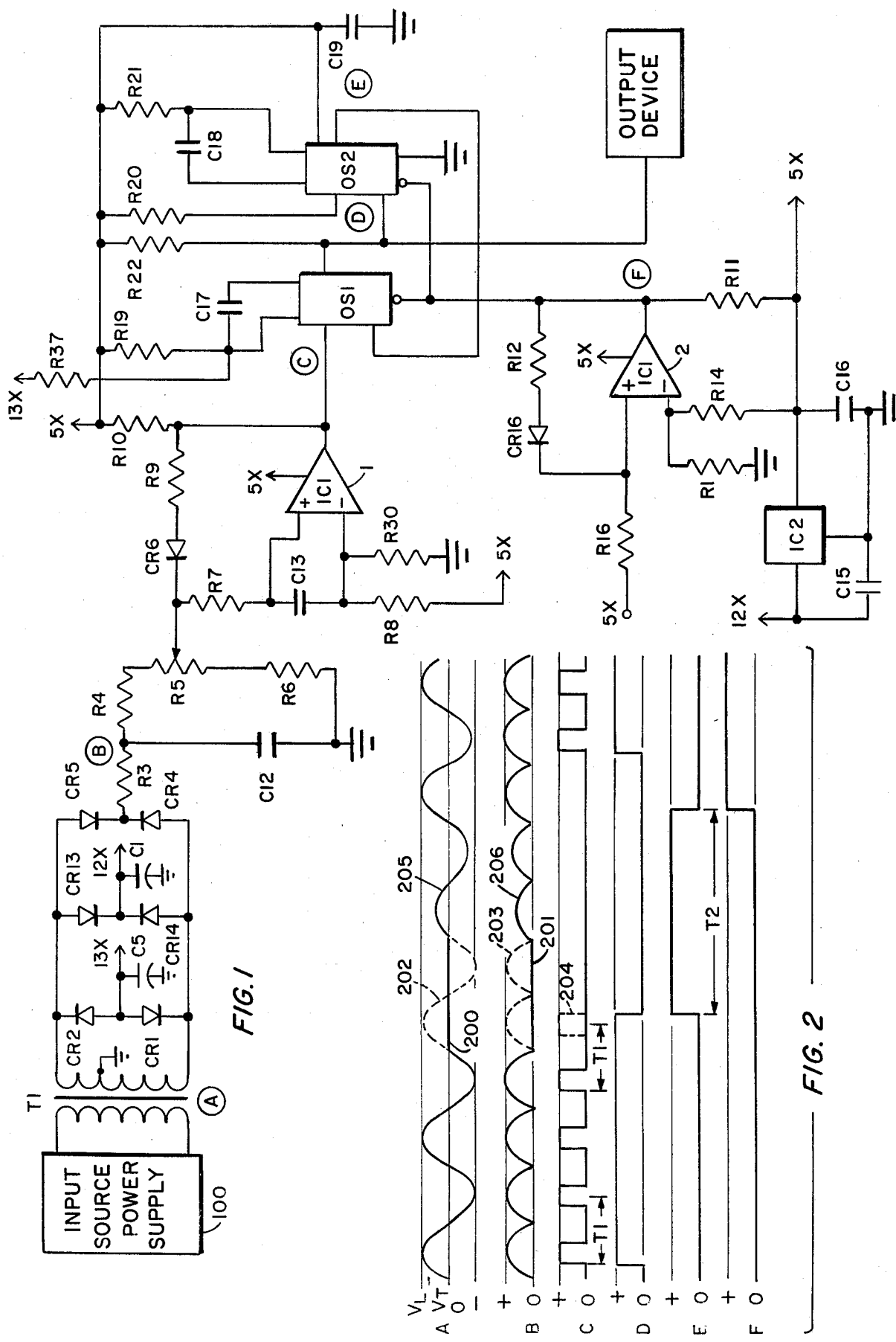

POWER FAILURE DETECTION AND CONTROL CIRCUIT

BACKGROUND

1. Field of the Invention

This invention is directed to power failure detection circuits, in general, and, more particularly, to circuits for detecting a power failure in a computer system and for preventing the system from operating in the absence of proper input power.

2. Prior Art

There are many circuits known in the art which serve the purpose of detecting power failure, insufficient power and the like. These circuits range anywhere from a simple relay circuit which merely drops out when the power applied to a circuit falls below a specified level to very complicated circuits for detecting power supply signals within very limited ranges.

Some of these circuits are arranged to permit the ultimate circuit or system to become operative again when the input power reaches a prescribed level. However, in many instances, this is not a significant problem inasmuch as the system merely becomes operative again and performs its specified function. However, in many instances, such as computer systems and the like, it is essential that the system not become operative again until the power supplied thereto reaches a specific level, for example, a level which renders the logic circuits in the computer operative.

Most of the circuitry which performs this function (i.e. power failure detection) is quite complex and, therefore, expensive. It is highly desirable to provide such a circuit which detects a power failure and prevents operation of the system until power reaches a prescribed level while doing so in an inexpensive and relatively simple manner.

SUMMARY OF THE INVENTION

The circuit described herein is sensitive to power failures wherein the input power falls below a prescribed level. The circuit operates to produces pulses as a function of the input signal level. When the input signal level falls below a prescribed threshold, the pulses are discontinued. A second pulse source is selectively operated as a function of the first pulse source. The second pulse source produces a control pulse in the absence of pulses from the first pulse source and, thereby, inhibits operation of the first pulse source. A further threshold detector determines when the input power source has regained a certain threshold value and supplies signals to the first and second pulse sources to reset the operation thereof in order to permit the system to become operative again.

BRIEF DESCRIPTION OF THE DRAWINGS

FIG. 1 is a schematic diagram of a preferred embodiment of the instant invention.

FIG. 2 is a timing diagram showing respective pulses throughout the circuits shown in FIG. 1.

DESCRIPTION OF A PREFERRED EMBODIMENT

Referring now to FIG. 1, there is shown a schematic diagram of a preferred embodiment of the instant invention. In this arragement, an input source or power supply 100 is used to supply power to the overall system. This power supply may be line voltage, a regulated voltage, or the like. Source 100 is connected to the primary winding of transformer T1. The secondary winding of transformer T1 is shown connected as a center tapped ground while the opposite end terminals thereof are connected to the anodes of diodes CR13 and CR14, respectively. The cathodes of these diodes are connected together and to ground via filter capacitor C1. This common junction is also used to provide the signal 12X which is a power or voltage source supplied to the logic circuitry of this system.

Similarly, the cathodes of diodes CR1 and CR2 are connected to the opposite end terminals of transformer T1. The anodes of diodes CR1 and CR2 are connected together and to one side of filter capacitor C5. This common junction provides the voltage or power signal 13X.

Also connected across the secondary winding of transformer T1 is the combination of diodes CR5 and CR4. The anodes of the diodes are connected to the terminals of the secondary winding while the cathodes are connected together. The common junction of the cathodes of diodes CR4 and CR5 is, effectively, the output terminal of the supply network. Resistor R3 is connected to the common junction and to the smoothing network comprising series connected resistors R4, R5 and R6 which are connected in parallel with capacitor C12 and connected to ground. Resistor R5 is a variable resistor with the adjustable terminal (or wiper arm) connected to the series network comprising resistors R7 and R8 with capacitor R13 connected therebetween. This network is returned to the 5-volt source represented by terminal 5X. The common junction between resistor R8 and capacitor C13 is connected to the minus (−) input terminal of comparator 1 with the limiting resistor R30 connected to ground. The common junction of resistor R7 and capacitor C13 is connected to the plus (+) input terminal of comparator 1. The output terminal of comparator 1 is connected to the plus (+) input terminal thereof via the feedback network comprising resistor R9 and diode CR6. In addition, the output terminal of comparator 1 is connected to pull-up resistor R10 and to the input terminal of one-shot circuit OS1. The timing control circuit comprising resistor R19 and capacitor C17 is connected to one-shot circuit OS1 and to the 5-volt source. Resistor R37 is connected between terminal 13X and the one-shot OS1. This connection permits the time constant of one shot OS1 to be proportional to the input voltage as described hereinafter.

The output terminal of one-shot OS1 is connected to the pull-up resistor R22 and to the inhibit input terminal of one-shot OS2. In addition, the output terminal of one-shot OS1 is connected to the output terminal of the instant circuit. The input terminal of one-shot circuit OS2 is connected to the 5-volt source via resistor R20. In addition, the timing control network comprising resistor R21 and capacitor C18 is connected from one-shot OS2 to the 5-volt source.

The output terminal of one-shot OS2 is connected to the inhibit terminal of one-shot OS1. Appropriate voltages are provided to both of the one-shots, although only the connections to one-shot OS2 are depicted. It must be understood that one-shots OS1 and OS2 can be formed in a single integrated circuit requiring only one connection to be shown.

The reset terminals of one-shots OS1 and OS2 are connected to the output of comparator 2, which can be a comparator of similar construction to comparator 1. The plus (+) input terminal of comparator 2 is connected to a 5-volt source via coupling resistor R16. This source is defined as the power source for the logic circuitry within the computer system.

A positive feedback network comprising resistor R12 and diode CR16 is provided. The minus (−) input terminal of comparator 2 is connected to ground via limiting resistor R31. In addition, the minus (−) terminal of comparator 2 is connected, via resistor R14, to a 5-volt source (i.e. terminal 5X) which is also connected to the output terminal of comparator 2 via resistor R11. Moreover, the integrated circuit IC2 is a voltage regulator circuit which is connected to the minus (−) input terminal of comparator 2 to supply a specified voltage thereto. Regulator IC2 receives power from terminal 12X described above.

In describing the operation of the circuit, concurrent reference is made to FIGS. 1 and 2. The input source 100 produces a generally sinusoidal input signal such as shown in waveform A of FIG. 2. This signal is induced in the secondary winding of transformer T1, as well. The operation of diodes CR4 and CR5 is typical, wherein a full wave rectified signal, such as shown at waveform B, FIG. 2, is produced and supplied to the positive terminal of comparator 1. A reference voltage is supplied to the minus terminal of comparator 1 so that the comparator produces an output signal only when the fully rectified signal is greater than the reference voltage. This has the effect of providing output pulses from comparator 1 as indicated in waveform C of FIG. 2. These signals have essentially twice the frequency of the input signal.

The signals of waveform C are applied to one-shot OS1 which produces a high level output signal. One-shot OS1 has a time constant T1 which is defined by resistor R19 and capacitor C17. So long as the signals applied to the input terminal of a retriggerable one-shot OS1 from comparator 1 are within the time period T1, the one-shot OS1 does not "time-out" and produces a high-level output signal. This high-level output signal is supplied to the inhibit terminal of one-shot OS2 and forces the output signal of one-shot OS2 to remain a low-level signal as shown in waveform E.

However, when the input signal shown in waveform A fails for some reason, as indicated at location 200, a different operation occurs. That is, the failure of the input signal produces the same signal failure as shown in waveform B at 201. As a consequence, no signal is produced at the output of comparator 1 as shown in waveform C. When the time out period T1 has been reached by one-shot OS1, the high-level signal produced thereby terminates and a low-level signal is produced (see FIG. 2D). As a result, one-shot OS2 is now able to produce a high-level output signal for time period T2 as a result of the signal applied to the input thereof from the 5-volt source.

For purposes of comparison, the dashed line waveform 202 is used to show the situation if the input signal had not failed. The signal 202 would have generated the signal 203 which would have generated the signal 204 from the comparator. The generation of the signal 204 would have continued waveform D at the high level. However, the failure of the input signal, as indicated by line 202, causes the waveform B to follow the line 201 and, consequently, the signal 204 is not produced wherein waveform D (the output of one-shot OS1) falls. Inasmuch as the signal at waveform D is the output signal which controls the remainder of the system, the system is rendered inoperative when the waveform D signal is low. Thus, when the signal D becomes low due to the failure of the power source, the entire system is turned off.

After some period of time, it is assumed that the input signal at waveform A is resumed. However, it is assumed that the input signal follows the waveform as indicated at 205, which is insufficient to produce the waveform 206 in waveform B. These waveforms are below the required threshold for the remainder of the circuit. Consequently, these signals are insufficient to produce an output signal from comparator 1.

Irrespective of the operation of comparator 1, the signals supplied to comparator 2 are below the prescribed logic level signals, i.e. the signals required to render the logic circuitry operative. Therefore, comparator 2 produces a low-level signal which is applied to the reset terminal of one-shots OS1 and OS2, and the circuit remains off. Conversely, when the voltage applied to the circuit reaches the appropriate level, comparator 2 produces a high-level output signal as suggested in waveform F in FIG. 2. This signal effectively enables one-shots OS1 and OS2 and returns the circuit to the original conditions. That is, one-shots OS1 and OS2 return to the operation note and described above. In particular, the signal of waveform D returns to the high level and the system is reactivated. In addition, the high-level output signal from comparator 2 is fedback to the plus (+) input terminal thereof to effectively latch comparator 2 in the one condition and to provide a hysteresis effect. That is, the comparator can be switched to produce the low level signal again when the input becomes undesirably low. However, this effect can be controlled by the feedback network.

As noted, resistor R19 and capacitor C17 effectively establish the time constant T1 for OS1. However, it may be essential that the time out period be altered relative to the input power signal. To this effect, resistor R37 is connected between the time constant circuit and terminal 13X. As a consequence, when the line voltage at source 100 varies, the voltage at terminal 13X also varies. Therefore, the voltage supplied to the time constant circuit is varied via the resistor R37 network. Because of the arrangement of diodes CR2 and CR1, the more negative the voltage at terminal 13X, the longer time period T1 becomes. Of course, as the voltage at terminal 13X goes more positive, the time period T1 becomes shorter. Thus, the operation of one-shot OS1 is controlled by, and proportional to, the line voltage. This operation overcomes the potential difficulties which could be encountered if a fixed time constant were used in the face of a variable power source.

Thus, there is shown and described a power failure detection circuit which is especially useful with computer circuitry or the like for detecting the loss or absence of input power. Moreover, the circuit detects when the input power has been properly restored to the appropriate operating condition and then, and only then, permits the system to go back on-line and become operative. The preferred embodiment includes various types of components which have been shown and described. Other similar components can be substituted therefor by those skilled in the art without departing from the spirit of the invention. Any such modifications which fall within the purview of this description are intended to be included herein as well. That is, the description is intended to be illustrative only and is not intended to be limitative. Rather, the scope of the invention is limited only by the claims appended hereto.

Having thus described a preferred embodiment of the instant invention, what is claimed is:

1. A circuit for detecting the condition of a power source comprising, a first pulse circuit (1, OS1) for selectively generating pulses (D) of a first time period and frequency as a function of the signal (C) supplied thereto from said power source, a second pulse circuit (OS2) for selectively generating pulses (E) of a second time period and frequency as a function of the pulses (D) supplied thereto by said first pulse circuit, said second pulse circuit selectively supplying pulses to said first pulse circuit to effectively disable said first pulse circuit, and reset circuit means (2, etc) connected between said power source and each of said first and second pulse circuits to reset said first and second pulse circuits to a prescribed condition when said power source has returned to a prescribed level.

2. The circuit recited in claim 1 including pulse shaping means connected between said power source and said first pulse circuit.

3. The circuit recited in claim 2 wherein, said pulse shaping means comprises a first comparator circuit.

4. The circuit recited in claim 1, wherein, said reset circuit means comprises a second comparator circuit.

5. The circuit recited in claim 1 including, means connected between said power source and said first pulse circuit to vary the time period of said pulses generated thereby as a function of the signal supplied by said power source.

6. The circuit recited in claim 1 wherein, said first and second pulse circuits comprise first and second one-shot circuits, respectively.

7. The circuit recited in claim 6 wherein, said first one-shot circuit is retriggerable.

8. The circuit recited in claim 2 wherein, said pulse shaping means is connected to said power source and to a reference signal source to produce output signals only when said poer source provides a signal which is greater than said reference signal.

9. The circuit recited in claim 1 wherein, said power source is transformer coupled to said first pulse circuit.

10. The circuit recited in claim 9 including, full wave rectifier means connected between the transformer and said first pulse circuit.

* * * * *